May 26, 1970   R. P. HOPPER ET AL   3,513,641
FOREIGN PARTICLE SEPARATOR FOR AN AIR MOVING MEMBER
Original Filed June 12, 1964                               5 Sheets-Sheet 2
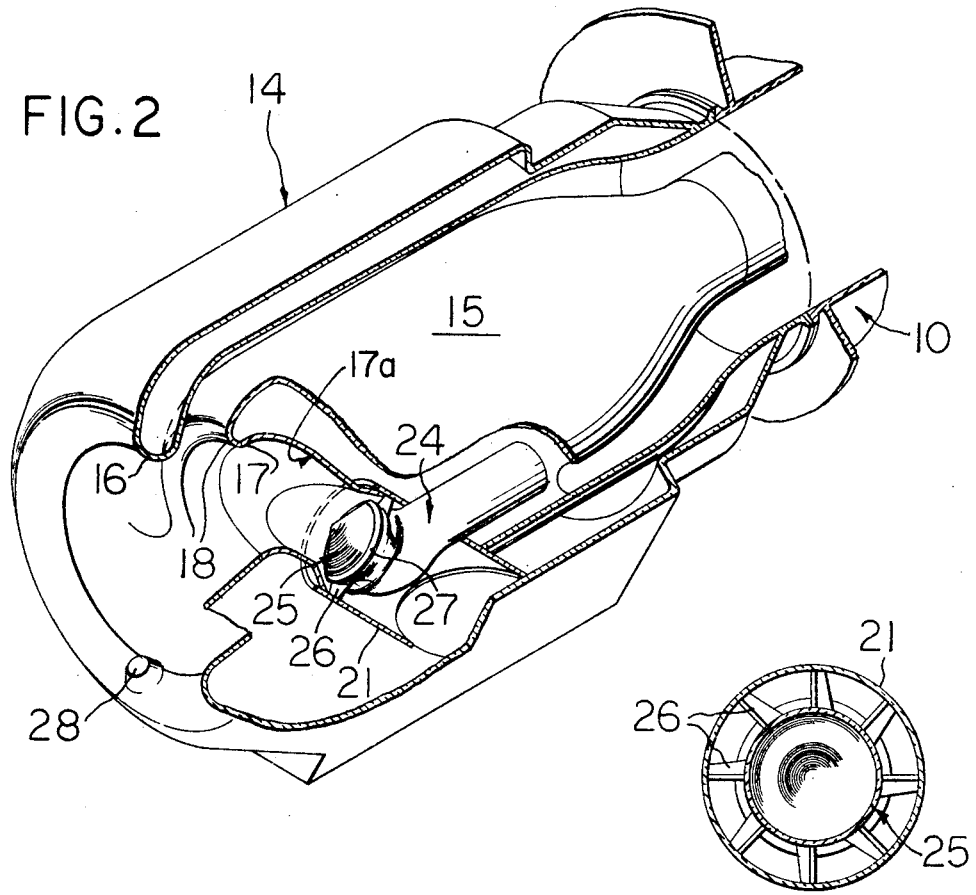
FIG. 2
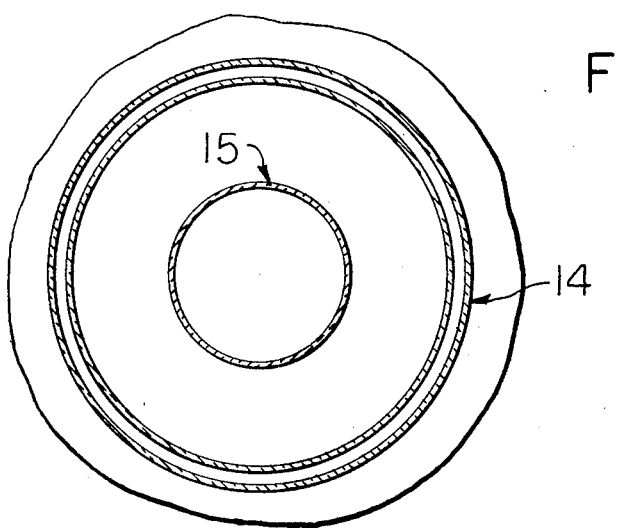
FIG. 5
FIG. 10
INVENTORS
ROBERT P. HOOPER
BY & VERNON L. ARNE
THEIR ATTORNEYS May 26, 1970 R. P. HOPPER ET AL 3,513,641
FOREIGN PARTICLE SEPARATOR FOR AN AIR MOVING MEMBER
Original Filed June 12, 1964 5 Sheets-Sheet 3

INVENTORS
ROBERT P. HOOPER
BY & VERNON L. ARNE
THEIR ATTORNEYS

INVENTORS
ROBERT P. HOOPER
BY & VERNON L. ARNE
THEIR ATTORNEYS

United States Patent Office 3,513,641
Patented May 26, 1970

3,513,641
FOREIGN PARTICLE SEPARATOR FOR AN
AIR MOVING MEMBER
Robert P. Hooper, Media, Pa., and Vernon L. Arne,
Winter Park, Fla., assignors to The Boeing Company,
Seattle, Wash., a corporation of Delaware
Continuation of application Ser. No. 374,605, June 12,
1964. This application Aug. 22, 1968, Ser. No. 755,518
Int. Cl. B01d 45/12
U.S. Cl. 55—306          5 Claims

ABSTRACT OF THE DISCLOSURE

A foreign particle separator for removing foreign particles from an airstream and adapted to provide a continuous untortured flow path for the particles. A focusing member defining an air inlet serves to guide particles in the airstream against a trap member which defines a secondary opening. The trap member includes a concave surface in open-faced relationship with the focusing member and angularly disposed relative to the focusing member to guide the particles into a collection area. One application of the separator is in combination with the air intake of an air moving member, for example, immediately preceding the compressor of a gas turbine engine.

---

This is a continuation of application Ser. No. 374,605 filed June 12, 1964, and now abandoned.

This invention relates to a particle separator for an airstream and, more particularly, to a foreign particle separator for use with the air intake of an air moving member such as a gaseous power plant.

The ingestion of foreign particles including moisture into any air moving member such as power plants, ducted fans, ground effect machines and the like creates problems in the operation of the air moving member by reducing the efficiency and/or damaging parts. One example of this is a gas turbine engine wherein foreign particles such as dirt, sand, water and the like materially shorten the life of various elements of the engine such as the blades of the compressor, for example. These foreign particles can cause substantial damage such as pitting, corrosion, fouling of various engine parts and other serious problems.

In addition to the deterioration caused by moisture particles, the ingested moisture tends to build up in the form of ice on the inlet structure when icing conditions prevail. This ice will break away from the inlet structure in chunks when melting occurs due to deicing or increase in temperature. The ice chunks enter the engine and can cause great damage to the compressors and like parts. Conventional traps and barriers are relatively ineffective since the ice forms on them and interiorly of them. The result is that there is no really effective solution to the problem of ice damage to the turbine engines.

The problem of ingested foreign particles including moisture is universal to all types of gas turbine engine usage; however, the problem is particularly troublesome in helicopter applications. The unique hovering characteristics and ability to land and take off from most any type of terrain or body of water makes the gas turbine-powered helicopter particularly susceptible to the problems created by foreign particles.

Thus, if a helicopter were to hover, land, or take off from a body of salt water, the ingestion of salt water is the result, with salt being deposited on the compressor blades causing performance losses. Similarly, if the helicopter is operated from land bases such as beaches, fields, mountainous terrain or the like, the engine intake will be contaminated by an ingestion of dirt, small particles of stone, sand or similar material with the consequent result of serious pitting, fouling or, in some instances, the initiation of fractures to delicate precision elements of the engine.

It should be noted in connection with the discussion above that recent tests of gas turbine engines over salt water and sandy areas have established that 5 percent power losses are common and occur within minutes in some cases. Projected power losses of this type will seriously limit the "safe" loads of the helicopter and, when they occur, may possibly endanger the aircraft.

Various structures have been employed for preventing foreign particles from entering a power plant such as a gas turbine engine. However, in order to remove particles of the small size of sand and water, most of the previously employed structures have caused an engine power loss in the range of 5 percent or more. This is usually caused by the angular changes in direction of the airflow prior to its entering the inlet of the engine, with resulting unfavorable velocity distribution.

In addition, prior separation means were required to provide auxiliary structures to stop relatively large foreign objects such as birds since the separator means employed were not capable of dealing with both small and large particles. Such auxiliary structures are extremely susceptible to icing and having a tendency to create undesirable pressure losses.

A satisfactory separator must provide maximum separation with a minimum of pressure loss. Failure to minimize pressure losses can be critical, for instance, in aircraft engines since loss of pressure entering the engine is equated directly to energy levels in the engine that are directly proportional to the horsepower output of the engine. For example, a loss of one horsepower in the horsepower output of a helicopter engine reduces the load capacity of the helicopter by 10 pounds. Thus, if there is a 5 percent engine horsepower loss, which is very common due to pressure loss, the load capability for a helicopter which has an engine with a rated 3,000 horsepower output is reduced by 1,500 pounds. Therefore, fine screens or elaborate labyrinths cannot be utilized to provide a satisfactory solution since they inherently cause high pressure losses.

The present invention satisfactorily solves the problem of removing particles of various sizes without significant power or pressure loss in the power plant. The separator of the present invention obtains the desired results by angling the trap passageway and disposing the entrance of the trap which receives the particles so that it faces the entering air. The present invention also utilizes a bounce plate to direct the heavier particles such as birds which fall from the entering air due to gravity and the downwash of the helicopter into the entrance of the trap. The location of the entrance of the trap does not require the particles which are carried by the airstream to pass through the airstream on multiple occasions to reach the entrance of the trap. The entrained moisture is directed into the trap before it has an opportunity to touch or contact any other portion of the air inlet. The result of this arrangement is immediate and effective separation with virtually no pressure loss and maximum moisture separation with substantial elimination of the icing problem. Tests with the foreign particle separator embodying the present invention have resulted in approximately 87 percent of all particles being separated from the air flowing into the power plant without any secondary flow, which occurs when the particles enter the entrance of the trap but escape therefrom, with a power loss of approximately .6 percent and a pressure loss of about .3 percent.

An object of this invention is to provide a foreign particle separator for the inlet of a power plant such as a gas turbine engine or the like.

Another object of this invention is to provide a foreign particle separator that is capable of removing most of the particles in the entering airstream without significant power and pressure losses.

A further object of this invention is to provide a foreign particle separator that is capable of removing a substantial portion of the moisture content in the air.

Yet another object of the invention is to provide a foreign particle separator which insures maximum moisture particle removal with the resultant reduction in icing problems.

A still further object of this invention is to provide a foreign particle separator which insures that moisture particles caught by gravity and downwash still must enter the trap area eventually.

Still another object of this invention is to provide a foreign particle separator that is capable of removing all sizes of particles and moisture from the incoming air.

A further object is to provide a foreign particle separator that will effectively separate a wide range of sizes and shapes without requiring multiple structures for the size ranges.

Yet another object of the invention is to provide a foreign particle separator that creates a minimum of pressure loss across the separator and a corresponding resulting minimum power loss.

Another object of this invention is to provide a foreign particle separator that maintains a positive suction pressure in the collection area to provide for ready removal of the particles directed into the collection area.

A further object of this invention is to provide a foreign particle separator having a secondary inlet configuration which is positioned and angled to obtain maximum separation with minimum pressure loss.

Another object of this invention is to provide a foreign particle separator having a novel secondary inlet configuration and a negative pressure in the secondary inlet to insure effective entrapment of entering foreign particles.

A still further object of this invention is to provide a foreign particle separator which provides a novel trap having an inlet configuration positioned with respect to the air inlet and a negative pressure in said trap so as to maintain maximum separation and minimum pressure loss.

A further object of this invention is to provide a foreign particle separator which provides no additional frontal area over that of the engine frontal area thereby minimizing the aerodynamic drag on the particular engine installation.

Other objects of this invention will be readily perceived from the following description, claims and drawings:

This invention relates to an air inlet assembly adapted to be connected to an air intake opening of an air moving member. The assembly has an air opening which normally is of greater area than the air intake opening of tht air moving member. The assembly has a passage providing communication from the air inlet opening to the air intake opening of the air moving member with the passage having an area at least equal to the area of the air intake opening of the air moving member. The assembly has a secondary opening communicating with the passage and disposed downstream of the air inlet opening in relation to the direction of air flow through the air inlet opening. The secondary opening faces the air inlet opening and has an area less than or equal to the area of the air inlet opening. The secondary opening is connected to a collection area in the assembly whereby particles entering the air inlet opening are directed through the secondary opening to the collection area.

The attached drawings illustrate a preferred embodiment of the invention, in which:

FIG. 2 is a perspective view of the air inlet assembly of the present invention;

FIG. 5 is a sectional view taken along the line 5—5 of FIG. 1;

FIGS. 7–10 are sectional views taken along the lines 7—7 to 10—10, respectively, of FIG. 1.

Figure 1:
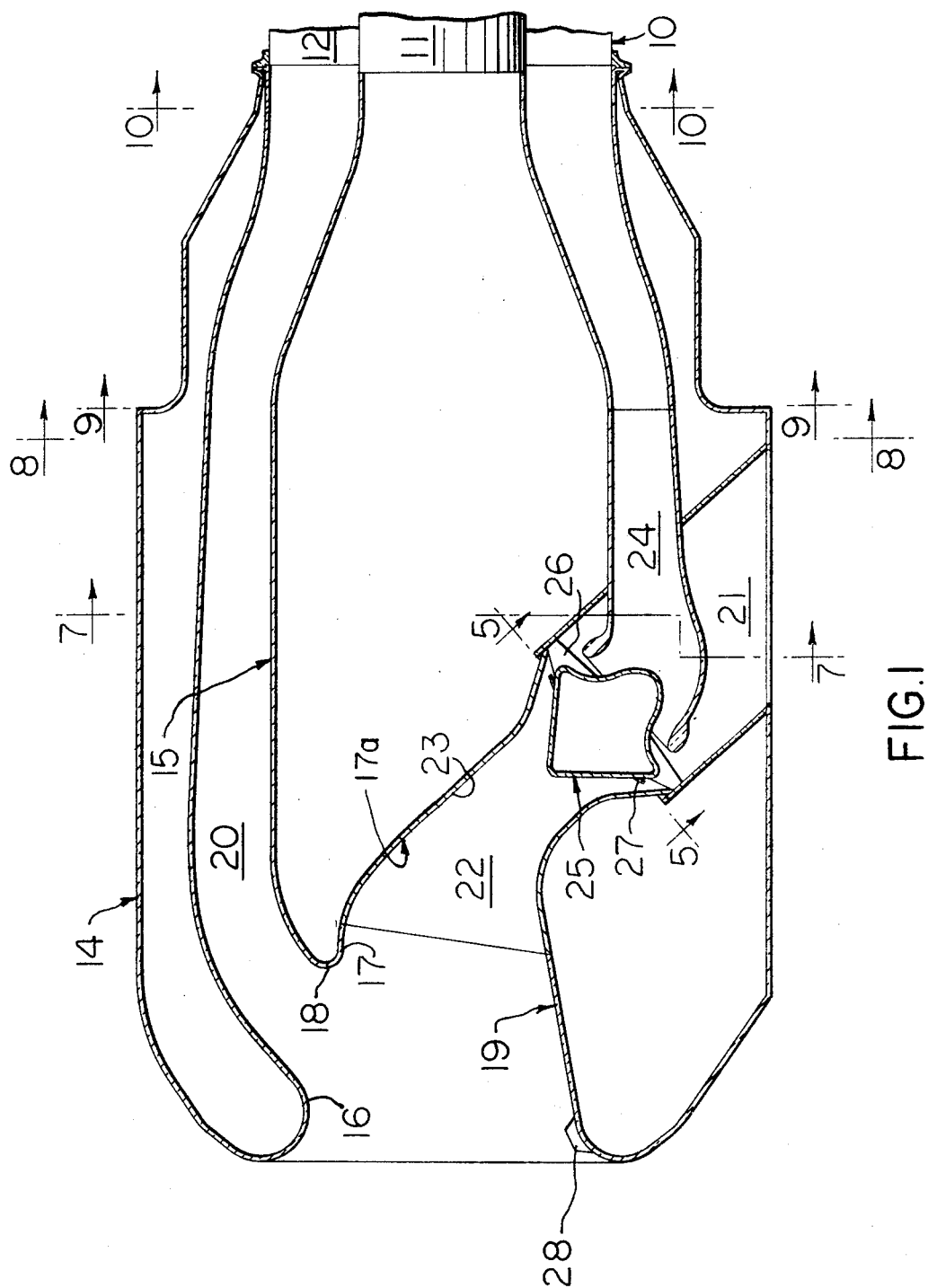
FIG. 1 is a sectional view of an air inlet assembly of the present invention.
Figure 3:
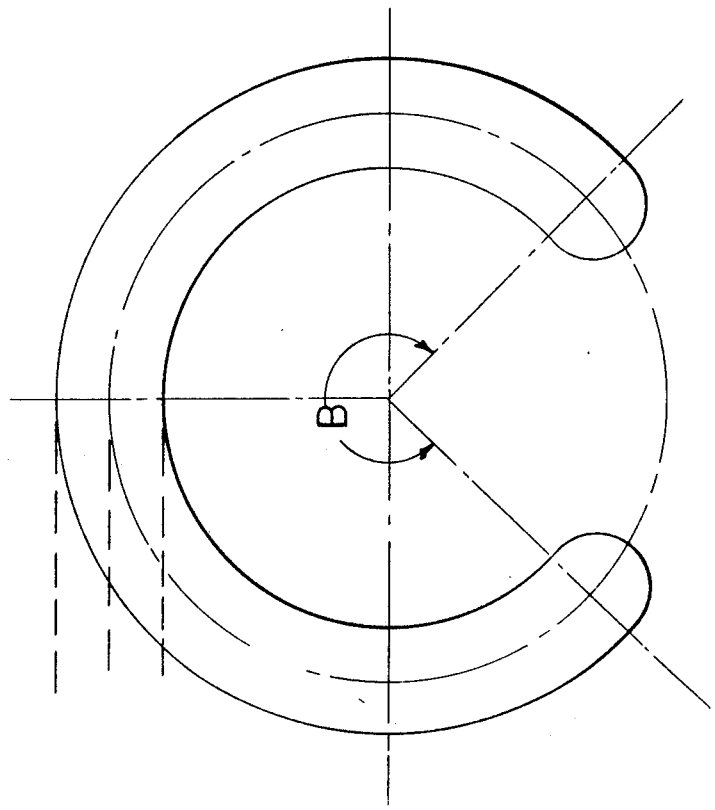
FIG. 3 is a schematic view of a portion of the air inlet to illustrate the relationship of the air flow and the passage therefor.
Figure 4:
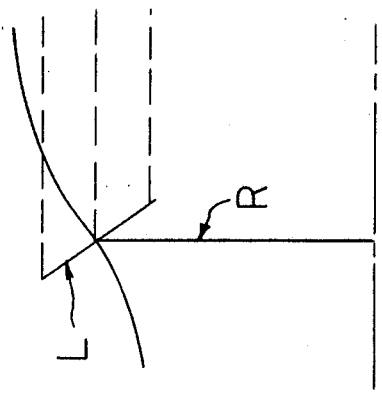
FIG. 4 is a schematic view of the side of FIG. 3.
Figure 6:
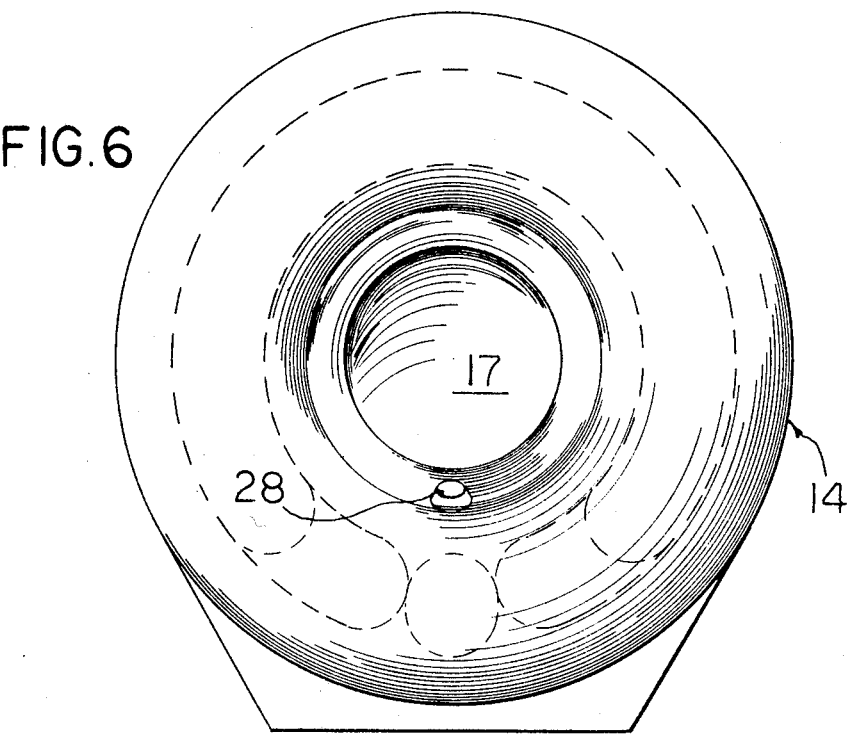
FIG. 6 is an end elevational view of the air inlet assembly of FIG. 1.
Figure 7:
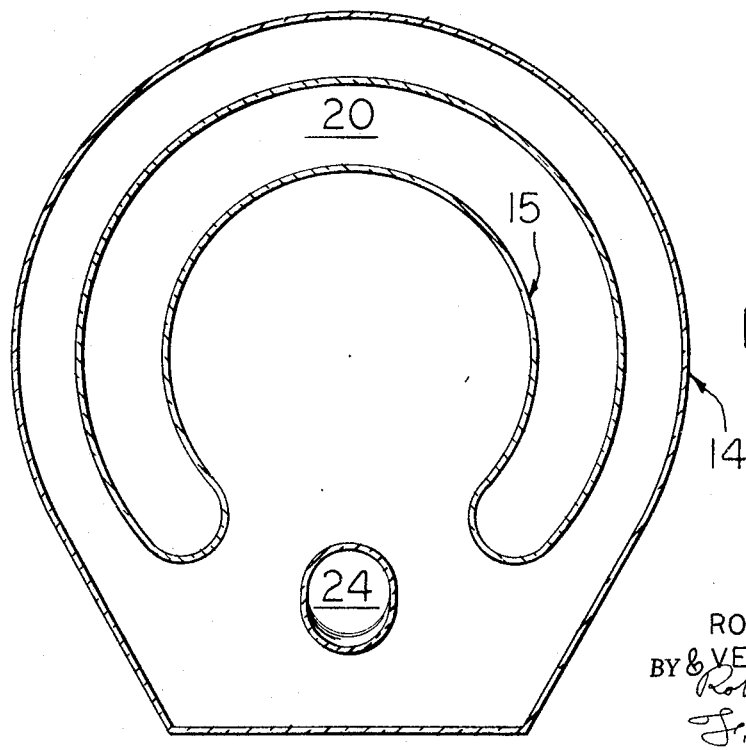
Figure 8:
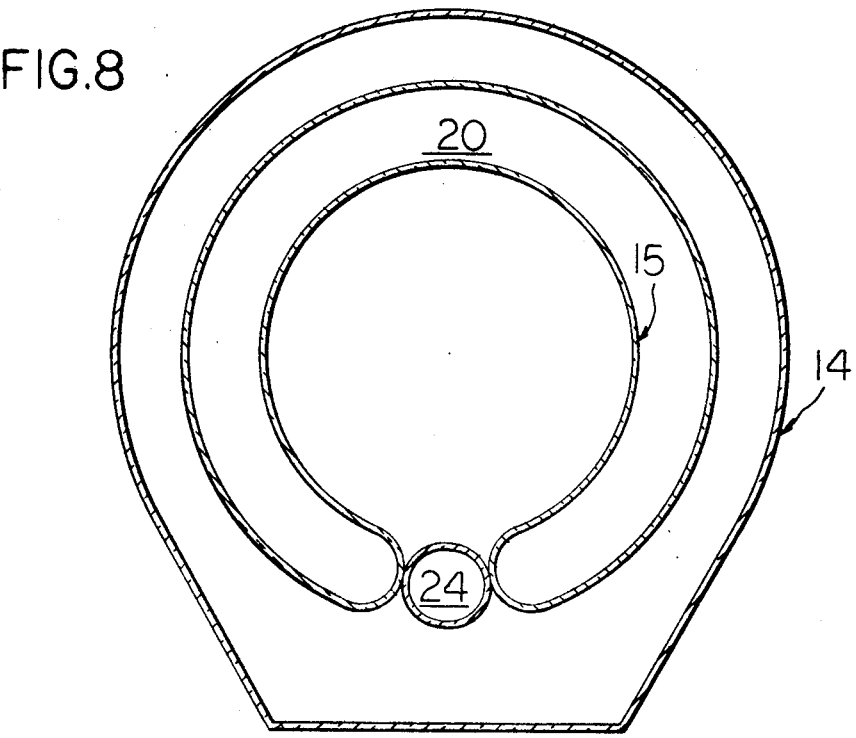
Figure 9:
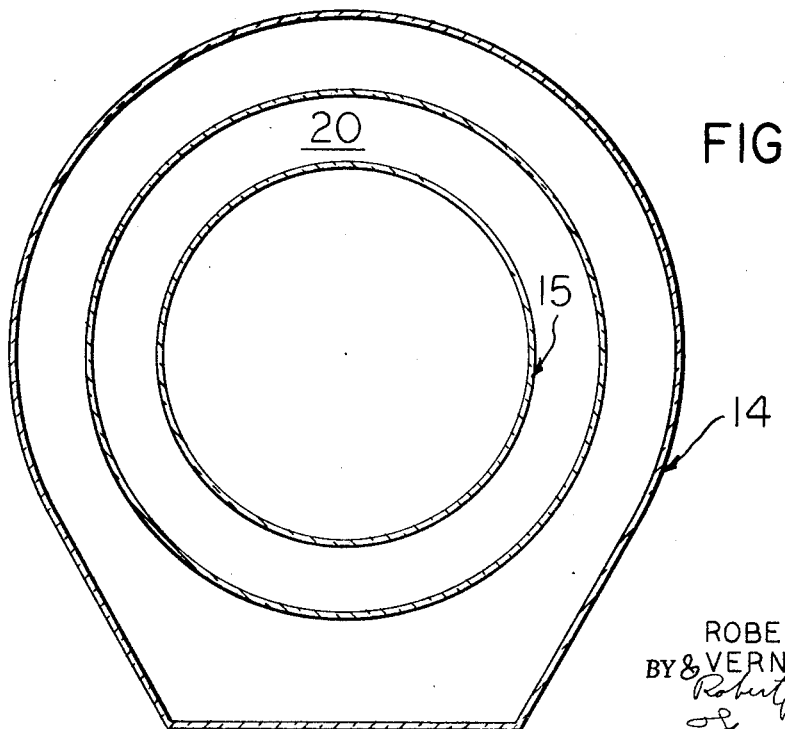

Referring to the drawings and particularly FIG. 1, there is shown a power plant 10 such as a gas turbine or the like. The power plant 10 includes a compressor 11 having an annular air intake opening 12.

An air inlet assembly 14, which is preferably formed of fiberglass, is adapted to be connected to the power plant 10. The air inlet assembly 14 includes a casing 15, which is adapted to enclosed auxiliary equipment such as a starter motor (not shown) for the compressor 11.

The air inlet assembly 14 includes an air inlet opening 16, which is preferably of circular configuration with its center on the centerline of the intake opening 12 of the power plant 10. Space requirements may dictate that the centerline of the air inlet assembly be angled with respect to the centerline of the power plant, but this has no material effect on the operation of the separator. The air inlet opening 16 functions as a focusing bell mouth in the manner described in the copending application of Robert P. Hooper and Andrew A. Peterson, Ser. No. 298,635, filed July 30, 1963, now Pat. No. 3,368,332, issued Feb. 13, 1968 and owned by the assignee of the present application. The air inlet opening 16 is contoured by rounding whereby the particles are directed into the air inlet assembly 14 without air separation and the subsequent air pressure losses. Specifically, the contour found on the air inlet opening 16 is in the form of a lip. It should be noted that the term "focusing" is used herein to describe the action of the outer wall radius. That is, foreign particles entrapped in the incoming air are caused to be concentrated by the inlet configuration at a point downstream of the outer wall radius. This concentration of particles is readily understood when it is recognized that the inlet lip radius, having been carefully selected, causes all air flow entering at a significant angle to the longitudinal centerline of the air inlet to converge inwardly, thus insuring that entrapped particles are given a direction and momentum toward the longitudinal centerline of the inlet. Of course, the significance of the focusing action lies in the fact that direction for separation purposes can be given the particles without creating airstream separation and turbulence. As noted above, this focusing concept is disclosed in the above-cited co-pending application.

The air inlet assembly 14 has an unobstructed secondary opening 17, which functions as an entrance to a trap for collecting the particles. The secondary opening 17, which is preferably of circular configuration and is disposed on the same centerline as the air inlet opening 16 and the power plant 10, is defined by a single continuous concave surface 17a on the casing 15 and by the assembly 14. The concave surface 17a faces the air inlet opening 16 and extends generally downwardly and rearwardly so as to provide an open-faced target for particles focused to it. At the upper and forward extremity of the concave surface 17a, the casing 15 has a lip 18, which is contoured aerodynamically to insure that air separation is not created.

The lowermost portions of the air inlet opening 16 and the secondary opening 17 are connected by a planar member 19, which functions as a bounce plate to direct the heavier particles into the secondary opening 17. That is, the heavier particles which fall, due to gravity or the downwash of the helicopter, from the airstream after it enters the air inlet opening 16 bounce from the planar member 19 into the secondary opening 17. The lip 18 of the secondary opening 17 also aids in insuring that the particles which bounce from the planar member 19 are directed into the secondary opening 17. The use of the planar member 19 enables the collection of relatively large particles which would normally bypass the trap area by going beneath the trap. The planar member also prevents moisture particles from collecting below the trap and eventually passing into the engine inlet.

As a result of the planar member 19, a passage 20, which connects the air inlet opening 16 with the intake opening 12 of the power plant 10, has a substantially inverted U-shaped annular cross section at its connection with the air inlet opening 16. The inner wall of the passage 20 is formed by the casing 15.

The secondary opening 17 is connected to a collection area 21, which functions as a trap for the particles, by a secondary duct or passage. The secondary duct or passage includes a portion 22, which is disposed at an angle to the centerlines of the air inlet opening 16, the secondary opening 17 and the intake opening 12 of the power plant 10. The purpose of the portion 22, which is preferably at an angle of 45° to the centerline of the inlet opening and secondary opening is to utilize the energy of the particles to direct them toward the collection area 21 and to provide a continuous and relatively untortured passage for the particles resulting in a minimum of contact with the surfaces of the trap and a minimum of turbulence in the trap.

The secondary duct or passage reduces in area from the secondary opening 17 until it reaches a minimum area 23. The secondary duct or passage has a portion 24 extending from the minimum area 23 for connection with the first passage 20.

A streamlined swirl separator 25 is supported in portion 22 near the end of the portion 24 of the secondary duct by a plurality of spaced swirl vanes 26. Each of the swirl vanes 26 has its blade trailing edge disposed at an angle of between 60° and 80° to the axis of the swirl separator 25 adjacent the swirl separator 25. The angle decreases proportionately to the radius of the swirl vane 26 so that the angle of the blade trailing edge of the connection of the swirl vane 26 to the inner wall of the portion 24 of the secondary duct or passage is approximately 30° to 40° with respect to the axis of the swirl separator 25.

The streamlined swirl separator 25 has a continuous lip or baffle 27 disposed on its circumference. The lip or baffle 27 causes any moisture which impinges on the swirl separator 25 to drip into the collection area 21 rather than remain on the separator 25 due to molecular cohesion and drop into the portion 24 of the secondary duct or passage.

It should be noted that the swirl vanes, swirl separator and portion 24 of the secondary duct may be removed and an exhaust fan inserted therefor. In certain applications the exhaust fan is entirely satisfactory. The exhaust fan would discharge the particles to the collection area 21 or directly overboard if this were possible. The exhaust fan could be located anywhere in the secondary passage, in the collection area or at the discharge port.

In order to prevent separation of the air flowing through the secondary passage or duct whereby turbulence is produced, the area of the secondary duct or passage is maintained constant from the minimum area 23 until the portion 24 connects with the first passage 20. The secondary duct or passage expands around the swirl separator 25 to insure that the area remains constant.

The area of the air intake opening 12 of the power plant 10 determines the relationship of the sizes of the various openings and passages of the air inlet assembly 14. For purposes of a complete disclosure, the relative dimensions of the preferred embodiment are given as exemplary. It should be appreciated that the size of the engine inlet, quantity of air, speed of air to be delivered and the like will be the prime determinant of the sizes and size relationships.

In the preferred embodiment the area of the intake opening 12 is preferably 20 to 30 percent smaller than the area of the air inlet opening 16 at the latter's minimum diameter. This insures that air reaches the intake opening 12 of the power plant 10 without any expansion of the area of the passage 20. This also insures that there is no airflow separation whereby there would be turbulence and subsequent power losses.

The diameter of the secondary opening 17 is approximately 75 percent of the minimum diameter of the air inlet opening 16 in the preferred embodiment, but it should be noted that the diameter could be the same as the inlet opening if desired. If the air inlet opening 16 is made too large with respect to the secondary opening 17, the percentage of separation for smaller particles would tend to diminish because they would not be focused toward the secondary opening 17. If the secondary opening 17 is made too large with respect to the air inlet opening 16, separation of the incoming air will occur whereby there will be high pressure loses. Of course, the actual relation of the diameter of the secondary opening 17 to the air inlet opening 16 also depends upon the distance between the two openings. The exact distance between the two openings and the relationship of the diameters for any specific embodiment is determined by experimentation.

In the illustrated embodiment, the diameter of the secondary pasage or duct at its minimum area 23 is approximately 37½ percent of the minimum diameter of the air inlet opening 16. Thus, the area of the secondary duct or passage from the minimum area 23 until it connects with the first passage 20 is approximately .12 of the area of the air inlet opening 16 at its minimum diameter. Accordingly, the diameter of the secondary duct or passage must expand, as previously mentioned, to maintain the area constant about the swirl separator 25. The diameter of the swirl separator 25 is approximately one-half of the minimum diameter of the air inlet opening 16.

The swirl separator 25 functions to direct the particles outwardly away from the inlet of the portion 24 of the secondary duct or passage whereby the particles tend to fall into the collection area 21. However, further removal of the particles from the air stream entering the portion 24 of the secondary duct or passage is accomplished by the vanes 26, which centrifugally direct the particles away from the entrance to the portion 24 of the secondary duct or passage.

The area of the passage 20 between the air inlet and the secondary inlet reduces to approximately 90 percent of the area at 16 as the passage extends from the air inlet toward the secondary inlet. There is another decrease in the area of the passage 20 rearward of the secondary inlet structure which includes the collection area 21 and the swirl separator 25. This reduction in area of the passage 20 is another 10 to 20 percent. These reductions are designed to provide freedom from airflow turbulence and separation in accordance with good aerodynamic design practice.

While the portion 24 of the secondary duct or passage is shown as extending a substantial distance before it merges with the first passage 20, it should be understood that this lengthy extension is primarily due to the necessity of the casing 15 for enclosing the starter and other accessories (not shown) for the compressor 11 of the power plant 10. If these accessories were not positioned in front of the power plant 10, the portion 24 of the secondary duct or passage could terminate slightly rearward of the position in which it leaves the collection area 21. Of course, the secondary inlet structure extension in the passage would be minimal and would be governed by the requirements of conformance with good aerodynamic practice. That is, the secondary inlet structure could not be cut off abruptly immediately to the rear of the trap structure. Aerodynamic flow considerations require that the trap structure be streamlined as all other portions of the inlet to insure freedom from turbulence and airflow separation.

Surge, which is an oscillation of flow across the planar member 19 between the opposite sides of the air inlet opening 16, may occur. If this should occur, it will be necessary to employ a vortex generator 28. The vortex generator 28, which would be a rounded cylinder about one-half inch high and 3 inches in diameter when the minimum diameter of the air inlet opening 16 is approximately 12 inches, would be disposed adjacent the lip of the air inlet opening 16. Of course, the vortex generator 28 is not employed unless surge occurs and, in most applications, proper proportioning of the relative flow areas and a uniform low pressure in the trap duct will prevent the problem.

The relationship of the main air passage 20 and the secondary duct or passage which connects the secondary opening 17 to the collection area 21 is such that approximately 5 percent of the air entering the air inlet opening 16 is diverted into the secondary opening 17. This percentage may vary slightly. While this air is shown as being returned to the main air passage 20, it will be understood that this air could be vented overboard if desired. In this case an air mover such as a fan would replace the swirl separator as was discussed above.

By using the focusing bell mouth of the aforesaid Hooper et al. application, the foreign particles are focused toward the secondary opening 17. Furthermore, the suction within the secondary opening 17 is provided in the preferred embodiment by the inlet airstream and not by an external source. This is achieved because the entrance of the secondary opening 17 is facing the air entering the inlet opening 16 in open faced relationship so that full ram recovery occurs within the secondary duct or passage. The exit area pressure of the secondary passage 24 is highly negative whereby the suction within the secondary inlet structure is provided.

While the present invention has been described with respect to a structure employing openings with circular configuration, it should be understood that other configurations may be employed. For example, the various openings could be of rectangular shape. While the present invention has been described with respect to the air intake opening of a gaseous power plant such as a gas turbine engine, it should be understood that the separator may be employed with any air moving member.

An advantage of this invention is that it removes a large proportion of all particles regardless of size from the air flowing to the air inlet opening of a power plant while keeping the power loss of the power plant to less than 1 percent. Another advantage of this invention is that it removes the foreign particles from air flowing to the inlet of an air moving member without significantly affecting the flow path of the air. A further advantage of this invention is that the foreign particle separator maintains a positive pressure at the collection opening without any substantial increase in weight of the separator. Still another advantage of this invention is that streamline separation of the air flowing through the secondary ducting in the particle separator is eliminated. A still further advantage of this invention is that the reduced turning of the secondary air flow provides a more efficient pressure recovery. A further advantage of this inlet is that the frontal area (i.e. cross section) is no greater than the engine frontal area, thus minimizing the aerodynamic drag on the particular engine installation. An additional advantage is the effective removal of moisture which substantially reduces the icing problems.

For purposes of exemplifications, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A separator for removing foreign particles from air comprising an outer hollow member of generally circular cross-section having inlet and outlet ends, focusing means on said outer member at said inlet end for directing particles into a collection passage means, an inner member generally circular in cross-section positioned substantially co-axially within said outer member and spaced from the inner surface and the inlet of said outer member to define an air passage therebetween, said inner member having a concave front face wall spaced rearwardly of said focusing means extending downwardly and rearwardly through the centerline of the outer member, a lip extending forwardly from said front face wall peripherally about the top and sides thereof, a horizontal substantially planar plate extending from said inlet end of said outer member to said lip the bottom inner surface of the outer member to define a secondary inlet opening, said air passage at said secondary inlet opening being of inverted U-shape, a collection passage means extending from said secondary inlet opening downwardly and rearwardly through the centerline of the outer member, and a collection conduit extending outwardly and downwardly through the outer member's inner surface to define a collection area, said collection passage means being formed by the front face wall of the inner member and the bottom inner surface of the outer member.

2. A foreign particle separator as set forth in claim 1 wherein said focusing means includes a lip on said outer member for focusing the particles toward said concave surface.

3. A foreign particle separator as set forth in claim 1 wherein the center line of said collection passage is disposed at an angle approximately 45° to the center line of said air passage.

4. A foreign particle separator as set forth in claim 1 including a swirl separator within said collection passage means and a plurality of swirl vanes mounted on the inner peripheral surface of said collection passage means and supporting said swirl separator.

5. A foreign particle separator as set forth in claim 1 including separator means positioned within said collection passage means to separate particles from the air, and conduit means receiving said separated air connected to said air passage

References Cited

UNITED STATES PATENTS

| | | |
|---|---|---|
| 537,048 | 4/1895 | Lee. |
| 2,173,330 | 9/1939 | Gregg. |
| 2,158,863 | 5/1939 | Randall. |
| 2,575,415 | 11/1951 | Grimac. |
| 2,600,302 | 6/1952 | Kinsella. |
| 2,616,519 | 11/1952 | Crankshaw et al. |
| 2,636,666 | 4/1953 | Lombard. |
| 2,663,993 | 12/1953 | Mosser. |
| 2,802,618 | 8/1957 | Prachar. |
| 2,921,646 | 1/1960 | Poole. |
| 2,944,731 | 7/1960 | Kastan. |
| 2,699,906 | 1/1955 | Lee et al. _____ 55—306 |
| 3,242,671 | 3/1966 | Moorehead _____ 55—306 |
| 3,368,332 | 2/1968 | Hooper et al. _____ 55—306 |
| 2,732,032 | 1/1956 | Sandison. |
| 3,148,043 | 9/1964 | Richardson et al. |

FOREIGN PATENTS 143,697    10/1951    Australia.

FRANK W. LUTTER, Primary Examiner

B. NOZICK, Assistant Examiner

U.S. Cl. X.R.

55—457, 468; 60—39.09; 244—53